Figure 1:
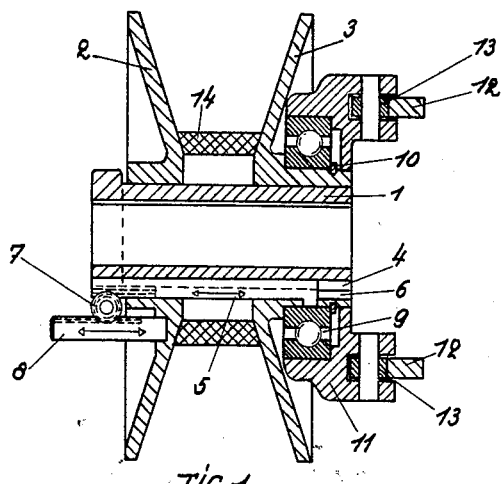

June 21, 1960  W. WROBBEL  2,941,412

VARIABLE-RATIO V-BELT DRIVE

Filed June 13, 1957

INVENTOR

Werner Wrobbel

BY Michael S. Striker
   agt.

United States Patent Office 2,941,412
Patented June 21, 1960

2,941,412

VARIABLE-RATIO V-BELT DRIVE

Werner Wrobbel, Nurtingen, Wurttemburg, Germany, assignor to Firma Metabowerk Closs, Rauch & Schnizler K.G., Nurtingen, Wurttemburg, Germany.

Filed June 13, 1957, Ser. No. 665,393

Claims priority, application Germany June 26, 1956

9 Claims. (Cl. 74—230.17)

This inveniton relates to a V-belt drive of continuously-variable ratio, of the kind comprising a driving shaft and a driven shaft, the distance between the shafts being variable, and two spaced pulley discs which are mounted for axial movement in opposite directions on a common hub secured to one of said shafts, the pulley discs being interconnected by means (for example toothed racks and a pinion) ensuring positively that the discs move in opposite directions.

In such a drive of known construction the two pulley discs are loaded by a compression spring, the force of which increases as the pulley discs move apart.

An object of the present invention is to provide an improved V-belt drive.

According to the invention a V-belt drive of the kind referred to is characterised in that one of the pulley discs is located by means of a locating element which does not partake of the rotary motion of the pulley discs and a cam rail transverse to the axis of rotation of the pulley discs, the distance of the locating element from a fixed datum line (and thereby the relative spacing of the pulley discs) being determined by the cam rail and in dependence upon the distance between the shafts.

The invention thereby provides in an advantageous manner a V-belt drive of the kind referred to and which has some of the better characteristics of a conventional step-change V-belt drive and which is not sensitive to shock-loading. A further advantage of the invention is that the pulley discs are not forced apart by the V-belt itself and therefore exert no undue pressure on the belt.

Advantageously the drive according to the invention may be constructed so that a pinion is mounted eccentrically to the shaft on the common hub on the side remote from the locating element, and two toothed racks are arranged on that side of the hub on which the pinion lies, one of the toothed racks being connected on the outside to the pulley disc nearer to the pinion, and the other toothed rack being connected with the other pulley disc through the hub of the first-mentioned pulley disc and guided in axial grooves in the hub of the first-mentioned pulley disc and in the common hub. The construction may be such that the pulley discs are connected to the common hub by elements such as sliding keys whereby relative rotation is prevented and the connecting members between the pulley discs can move the latter only axially.

In order to reduce the friction between the locating element and the pulley disc and the friction between the locating element and the cam rail, it is preferred that the locating element is of annular form and is mounted on the hub of one pulley disc by means such as a ball-bearing permitting relative rotation and engages the cam rail by means of rollers.

Figure 2:
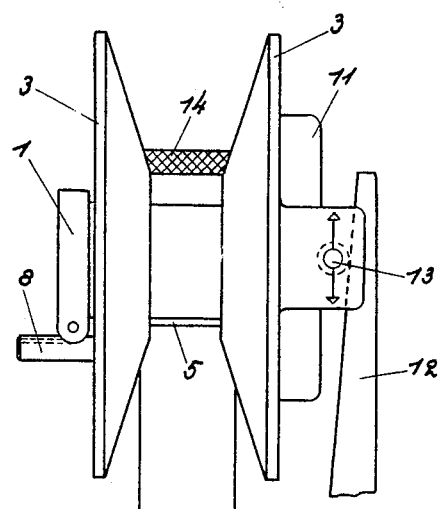

In the accompanying drawing the invention is illustrated by way of example,

Figure 1 being a sectional elevation showing the arrangement of the pulley discs, and Figure 2 a plan corresponding to Figure 1. The illustrated arrangement comprises a common hub 1 which can be secured to the shaft of a driving device, for example an electric motor. On this hub 1 are arranged two conical pulley discs 2 and 3 the hubs of which are axially slidable upon the common hub 1. In a keyway 4 in the common hub 1 is slidably arranged a toothed rack 5 which is fixed to the pulley disc 3. The arrangement can with advantage be so constructed that the toothed rack 5 also projects into slots 6 in the hubs of the two pulley discs 2 and 3 and thereby prevents rotation of the pulley discs relative to the common hub 1. A pinion 7 meshes with the toothed rack 5 and is mounted at one end of the common hub 1. On the side remote from the toothed rack 5 this pinion 7 meshes with a toothed rack 8 which is fixed to the pulley disc 2.

On the hub of the pulley disc 3 is a ball-bearing 9 which is secured against axial movement by means of a circlip 10. Over this ball-bearing 9 is pressed an annular locating element 11 which does not rotate during the operation of the drive. If a force is exerted in the axial direction on the locating element 11 the pulley disc 3 is moved in the axial direction towards the middle of the common hub 1. Motion is transmitted through the toothed rack 5 and the pinion 7 and the toothed rack 8 to the pulley disc 2 and the latter moves in the opposite direction to that of the pulley disc 3 towards the middle of the common hub 1. This axial pressure on the locating element 11 can for example be exerted by means of two fixed cam rails 12 having suitably inclined abutment surfaces, the locating element 11 engaging the rails 12 by means of two rollers 13.

Upon reduction of the distance between the driving shaft and the driven shaft of the V-belt drive incorporating the illustrated arrangement the rollers 13 travel along the cam rails 12 and the pulley discs 2 and 3 are thereby caused to move towards each other in the manner described above. A V-belt 14 between the pulley discs 2 and 3 acts as a buffer and in a manner corresponding to the reduction of the distance between the driving shaft and the driven shaft runs on to parts of the pulley discs 2 and 3 which lie farther out from the axis of rotation; the belt is not subject to any undue pressure from the pulley discs. In this manner the effective diameter about which the belt 14 runs is varied.

If on the other hand the distance between the driving shaft and the driven shaft is increased the space between the pulley discs 2 and 3 is correspondingly increased and the effective diameter about which the belt 14 runs is correspondingly smaller.

The selected and adjusted effected diameter about which the belt 14 runs is maintained even with shock overloading.

In order to achieve a larger range of adjustment there may be used combinations of several variable drives according to the invention.

I claim:

1. A pulley arrangement comprising, in combination, an elongated hub formed in its exterior surface with an axial keyway; a pair of pulley discs carried by said hub for axial movement therealong and respectively formed with a pair of keyways directed toward and communicating with said keyway of said hub; an elongated key located in all of said keyways for connecting said discs to said hub for rotation therewith, said key being fixed to one of said discs and being longitudinally slidable in the keyways of said hub and the other of said discs, and said key having rack teeth located outside of the space between said discs at the side of said other disc opposite from said one disc; a pinion turnably carried by said hub at said side of said other disc opposite from said one disc and meshing with said teeth; and a rack parallel to said key and fixed to said other disc outside of the space between said discs, said rack meshing with said pinion and the latter being located between said rack and key, so that said discs are compelled to move simultaneously toward and away from each other while only a portion of said key is located in the space between said discs; a locating element operatively connected to said one disc; and a cam rail engaging said locating element and acting on said locating element to provide axial movement of said locating element along said hub, said locating element moving said one pulley disc axially along said hub.

2. A pulley arrangement comprising, in combination, an elongated hub formed in its exterior surface with an axial keyway; a pair of pulley discs carried by said hub for axial movement therealong and respectively formed with a pair of keyways directed toward and communicating with said keyway of said hub; an elongated key located in all of said keyways for connecting said discs to said hub for rotation therewith, said key being fixed to one of said discs and being longitudinally slidable in the keyways of said hub and the other of said discs, and said key having rack teeth located outside of the space between said discs at the side of said other disc opposite from said one disc; a pinion turnably carried by said hub at said side of said other disc opposite from said one disc and meshing with said teeth; a rack parallel to said key and fixed to said other disc outside of the space between said discs, said rack meshing with said pinion and the latter being located between said rack and key, so that said discs are compelled to move simultaneously toward and away from each other while only a portion of said key is located in the space between said discs; a locating element operatively connected to said one disc for axial movement therewith; and a cam rail movable in a straight path perpendicular to the hub axis and engaging said locating element for moving said locating element axially along said hub, said locating element moving said one pulley disc axially along said hub.

3. A pulley assembly for a V-belt drive of continuously-variable ratio, comprising a common hub; two spaced pulley discs mounted for relative movement only on said common hub; means interconnecting said pulley discs and ensuring that they move in unison in opposite directions; a locating element secured against relative axial movement on the first of said pulley discs and free to remain stationary while said first of said pulley discs rotates; and at least one cam rail transverse to the axis of rotation of said pulley discs and acting on said locating element, whereby relative movements of said locating element to said cam rail cause axial movement of said locating element and said pulley discs along said common hub, said means interconnecting said pulley discs, comprising a pinion mounted on said common hub, a first toothed rack meshing with said pinion and secured to the first of said pulley discs, and a second toothed rack meshing with said pinion and secured to the second of said pulley discs, said first toothed rack being located in an axial groove in said common hub and in axial grooves in said pulley discs.

4. A pulley assembly for a V-belt drive of continuously-variable ratio, comprising a common hub; two spaced pulley discs mounted for relative movement only on said common hub; means interconnecting said pulley discs and ensuring that they move in unison in opposite directions; a locating element secured against relative axial movement on the first of said pulley discs and free to remain stationary while said first of said pulley discs rotates, and at least one cam rail transverse to the axis of rotation of said pulley discs and acting on said locating element, whereby relative movements of said locating element to said cam rail cause axial movement of said locating element and said pulley discs along said common hub, said assembly further comprising at least one roller mounted on said locating element and transmitting force between said locating element and said cam rail, and said means interconnecting said pulley discs, comprising a pinion mounted on said common hub, a first toothed rack meshing with said pinion and secured to said first of said pulley discs, and a second toothed rack meshing with said pinion and secured to the second of said pulley discs, said first toothed rack being located in an axial groove in said common hub and in an axial groove in each of said pulley discs.

5. A pulley arrangement comprising, in combination, an elongated hub; a pair of pulley discs carried by said hub for axial movement therealong; first actuating means secured to one of said discs; second actuating means secured to the other of said discs, both of said actuating means being located on the radially outer side of said hub and said second actuating means extending outside of said hub in an axial direction, said first and said second actuating means having opposite portions; and turnable means carried by said hub at the exterior thereof and operatively connected with said opposite portions of said first and second actuating means for moving one of said discs toward or away from the other disc by the same distance that said other disc is moved respectively toward or away from said one disc.

6. A pulley arrangement comprising, in combination, an elongated hub; a pair of pulley discs carried by said hub for axial movement therealong; first actuating means secured to one of said discs; second actuating means secured to the other of said discs, both of said actuating means being located on the radially outer side of said hub and said second actuating means extending outside of said hub in an axial direction, said first and said second actuating means having opposite portions; turnable means carried by said hub at the exterior thereof and operatively connected with said opposite portions of said first and second actuating means for moving one of said discs toward or away from the other disc by the same distance that said other disc is moved respectively toward or away from said one disc, said opposite portions of said first and second actuating means connecting said pulley discs with said hub for rotation therewith; a locating element operatively connected to one of said discs; and a cam means engaging said locating element to provide axial movement of said locating element along said hub, said locating element moving said one disc axially along said hub.

7. A pulley arrangement, comprising, in combination, an elongated hub, a pair of pulley discs carried by said hub for axial movement therealong; first actuating means secured to one of said discs; second actuating means secured to the other of said discs, both of said actuating means being located on the radially outer side of said hub and said second actuating means extending outside of said hub in an axial direction, said first and said second actuating means having opposite portions; and turnable means carried by said hub at the exterior thereof and operatively connected with said opposite portions of said first and second actuating means for moving one of said discs toward or away from the other disc by the same distance that said other disc is moved respectively toward or away from said one disc, said hub having a hollow entirely unobstructed interior and open ends so that a shaft may fill the entire interior and extend beyond both ends of said hub.

8. A pulley arrangement, comprising, in combination, an elongated hub; a pair of pulley discs, carried by said hub for axial movement therealong; first actuating means secured to one of said discs; second actuating means secured to the other of said discs, both of said actuating means being located on the radially outer side of said hub and said second actuating means extending outside of said hub in an axial direction, said first and said second actuating means having opposite portions; and turnable means carried by said hub at the exterior thereof and operatively connected with said opposite portions of said first and second actuating means for moving one of said discs toward or away from the other disc by the same distance that said other disc is moved respectively toward or away from said one disc; and said turnable means being located substantially outside of the space between said discs to permit a belt located between said pulley discs to approach very close to said hub when said discs are at a maximum distance from each other and to permit said discs to be moved toward each other to an end position where they are located closely adjacent to each other to permit a belt to be located close to the outer periphery of said discs.

9. A pulley arrangement, comprising, in combination, an elongated hub having a hollow entirely unobstructed interior and open ends so that a shaft may fill the entire interior and extend beyond both ends of said hub, said hub formed in its exterior surface with an axial keyway; a pair of pulley discs carried by said hub for axial movement therealong, and respectively formed with a pair of keyways directed toward and communicating with said keyway of said hub; an elongated key located in all of said keyways for connecting said discs to said hub for rotation therewith, said key being fixed to one of said discs and being longitudinally slidable in the keyways of said hub and the other of said discs, and said key having rack teeth located outside of the space between said discs at the side of said other disc opposite from said one disc; a pinion turnably carried by said hub at the exterior thereof and at said side of said other disc opposite from said one disc and meshing with said teeth; and a rack parallel to said key and fixed to said other disc outside of the space between said discs, said rack meshing with said pinion and the latter being located between said rack and key, so that said discs are compelled to move simultaneously toward and away from each other while only a portion of said key is located in the space between said discs.

References Cited in the file of this patent

UNITED STATES PATENTS

| | | |
|---|---|---|
| 2,196,605 | Johnson et al. | Apr. 9, 1940 |
| 2,283,392 | Shadrick | May 19, 1942 |
| 2,475,955 | Gerbing | July 12, 1949 |
| 2,573,493 | Rieser | Oct. 30, 1951 |
| 2,751,790 | Ingold | June 26, 1956 |
| 2,773,393 | Firth | Dec. 11, 1956 |
| 2,792,712 | Gibson | May 21, 1957 |